Sept. 27, 1927.

M. H. JOHANSON 1,643,813

TOOL MECHANISM FOR GEAR CUTTING MACHINES

Filed Dec. 30, 1925

INVENTOR
Magnus H. Johanson
BY
his ATTORNEY

Sept. 27, 1927.
M. H. JOHANSON
1,643,813
TOOL MECHANISM FOR GEAR CUTTING MACHINES
Filed Dec. 30, 1925
4 Sheets-Sheet 3
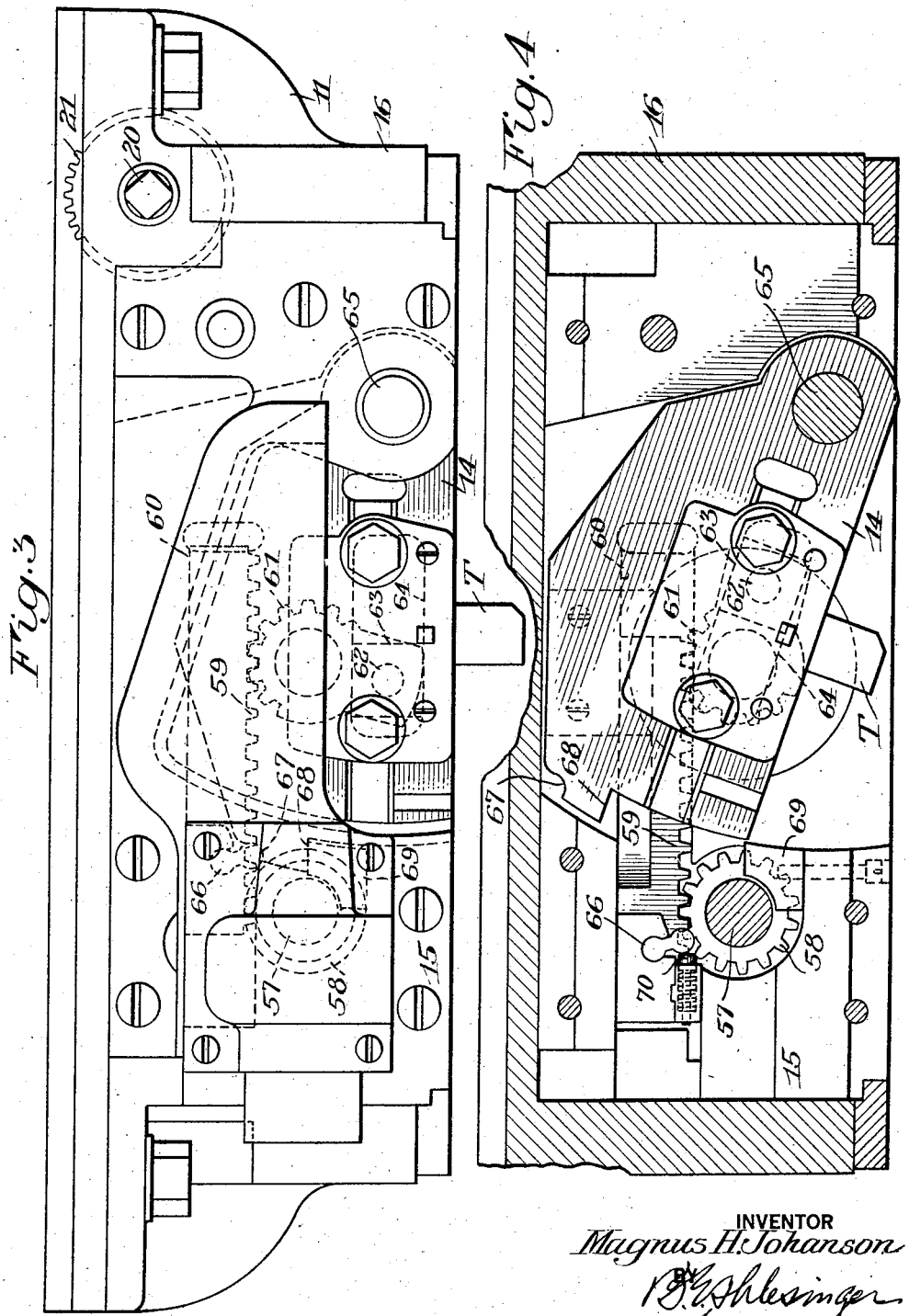
INVENTOR
Magnus H. Johanson
BY B. G. Schlesinger
his ATTORNEY

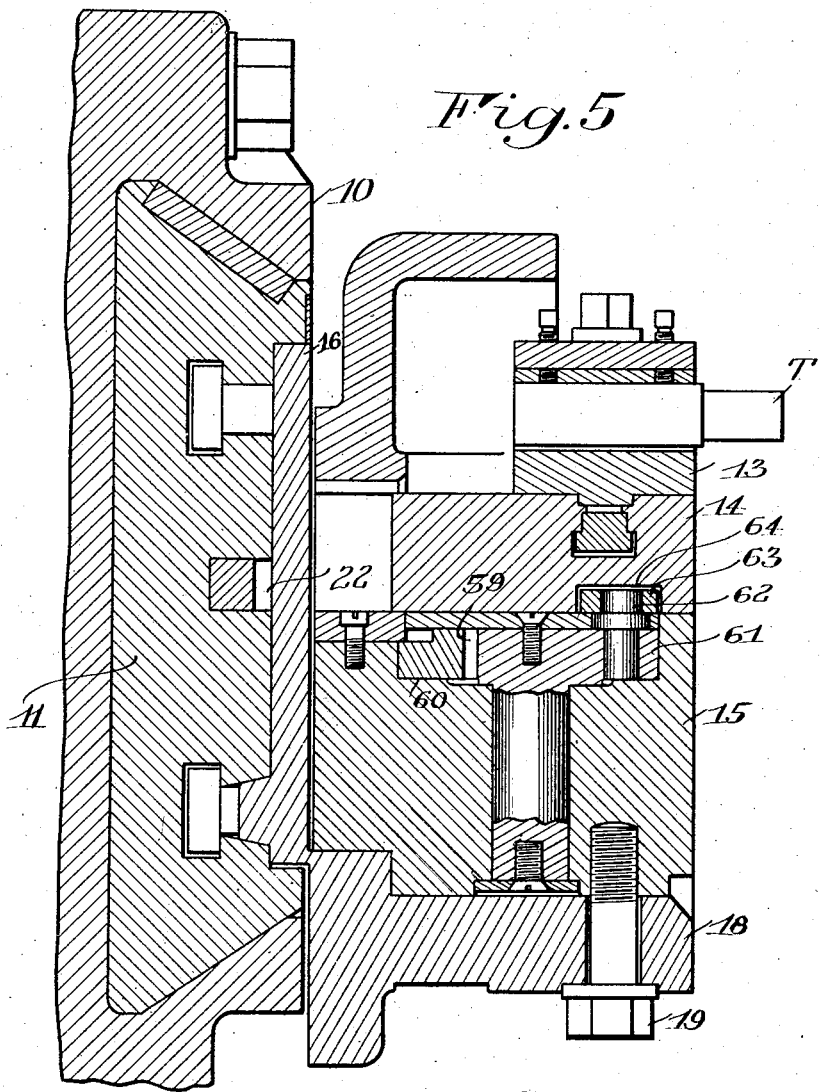
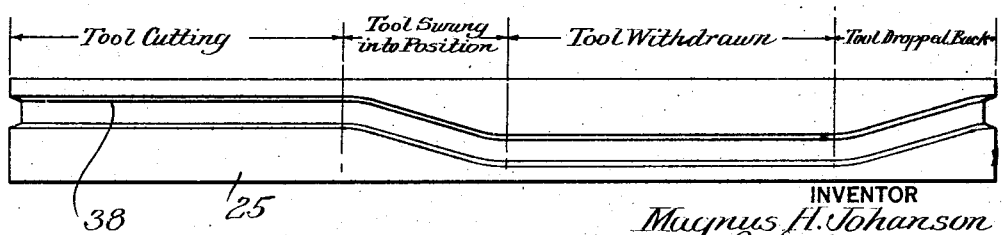

Patented Sept. 27, 1927.

1,643,813

UNITED STATES PATENT OFFICE.

MAGNUS H. JOHANSON, OF ROCHESTER, NEW YORK, ASSIGNOR TO GLEASON WORKS, OF ROCHESTER, NEW YORK, A CORPORATION OF NEW YORK.

TOOL MECHANISM FOR GEAR-CUTTING MACHINES.

Application filed December 30, 1925. Serial No. 78,359.

The subject of the present invention is a tool mechanism, particularly a tool mechanism for gear cutting machines.

One object of this invention is to provide means for positively moving a reciprocating tool to and from cutting position at desired points in its stroke.

A further object of the invention is to provide means whereby the tool clapping mechanism may be actuated in predetermined timed relation to the mechanism for reciprocating the tool.

Another object of this invention is to provide means for positively and completely withdrawing a tool from cutting position at the finish of its cutting stroke.

A still further object of the invention is to provide in a tool mechanism means for positively locking the tool in cutting position so as to obviate chatter during the cutting stroke.

Further objects of the invention will be apparent hereinafter from the specification and from the recital of the accompanying claims.

In the drawings I have illustrated one preferred embodiment of my invention. It will be understood, however, that this invention is capable of various further modifications within its scope and within the limits of the appended claims.

In the drawings:

Fig. 2 is a side elevation of the tool head of this machine;

Fig. 3 is a plan view of the same showing the tool in cutting position;

Fig. 4 is a transverse sectional view of the head showing the tool in non-cutting position;

Fig. 5 is a section on the line 5—5 of Fig. 2;

Fig. 6 is a detail of part of the tool clapping mechanism;

Fig. 7 is a section on the line 7—7 of Fig. 6; and

Fig. 8 is a lay-out of the cam controlling the clapping mechanism.

Figure 1:
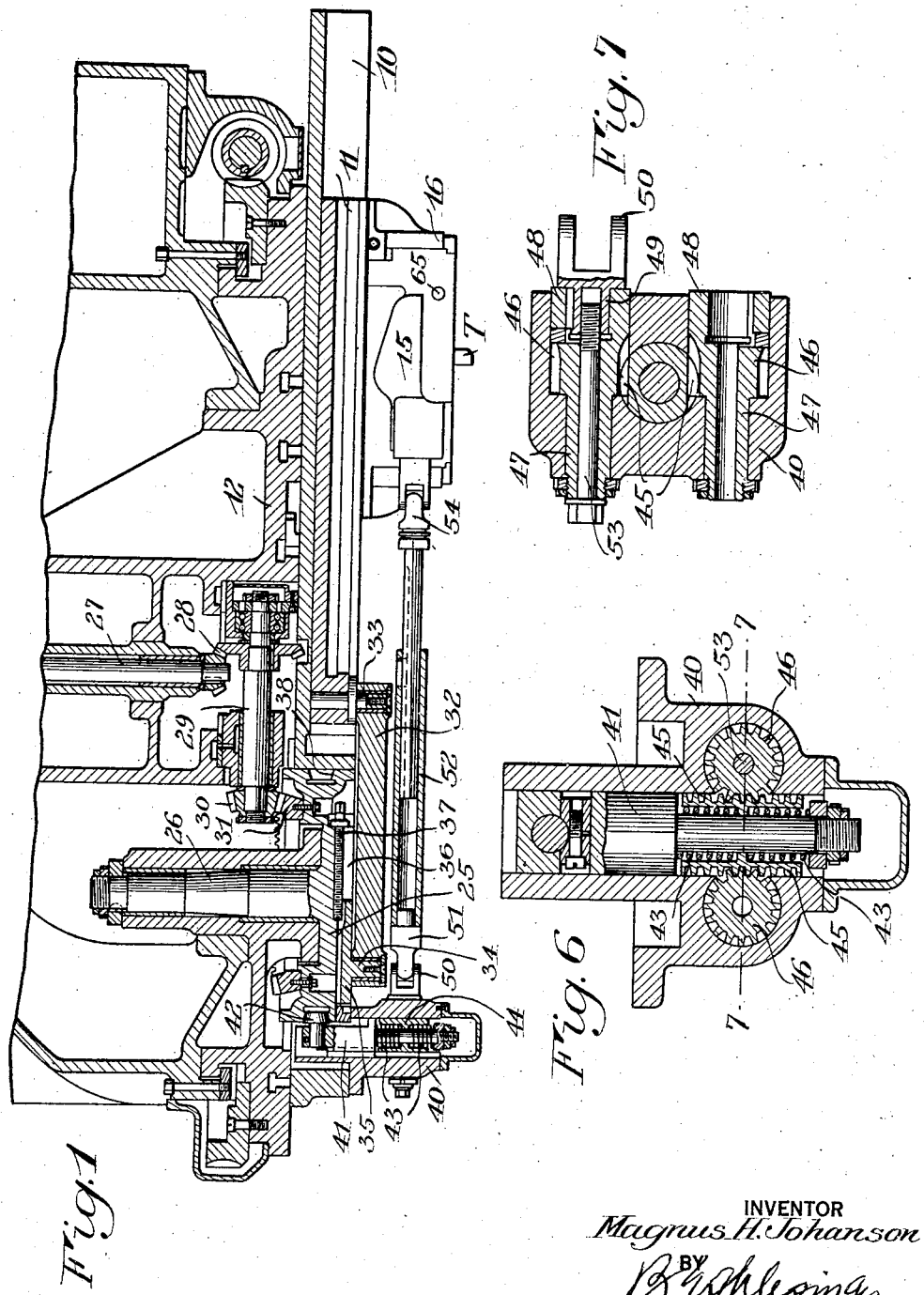
Fig. 1 is a partial sectional view through a gear cutting machine which is provided with a tool mechanism constructed according to one embodiment of my invention.

The present invention provides mechanism for reciprocating a tool across the face of the work blank and for automatically withdrawing the tool from and returning it to cutting position at predetermined periods in its cutting stroke. This invention is particularly suited for employment with gear cutting machines, such as described in the copending application of Allan H. Candee and the present inventor, Serial No. 70,864, filed November 23rd, 1925. It will be understood, however, that it is capable of employment with various other machines.

Referring to the drawings by numerals of reference, 10 indicates the guide within which is reciprocable the tool head slide 11. The guide 10 may be secured to the frame 12 of a gear cutting machine or other machine with which the tool mechanism of this invention is to be employed. The tool T itself, in the embodiment shown, is mounted for lateral and angular adjustment on the tool head slide. These adjustments permit of positioning the tool in correct relation to a gear blank to be cut so as to produce a gear such as described in the application above referred to. For the purpose of these adjustments, the tool T, which is secured in a block 13, is mounted upon a clapper block 14 which is pivotally mounted upon the clapper block support 15. The clapper block support 15 is angularly adjustable on the tool head 16, the clapper block support being provided with an arcuate surface 17 which seats in a correspondingly arcuate bed formed in the flange 18 of the tool head 16. The two arcuate surfaces are curved about a point which lies in the cutting edge of the tool so that in any adjusted position the tool will have the proper clearance. For the purpose of properly positioning the tool in its angular adjustment the tool head flange 18 may be provided with graduations which register against an index mark on the face of the clapper block support. Bolts 19 which pass through arcuate slots in the flange 18 and are in threaded engagement with the clapper block support serve to retain the tool in its position of angular adjustment. The tool head 16 is laterally adjustable on the tool head slide 11. For the purpose of effecting this last adjustment a shaft 20 (Fig. 2) is provided which is journaled in the head 16 and which carries a pinion 21 which meshes with the rack 22 (Fig. 5) which is secured to the tool head slide 11. These two adjustments are for the purpose of positioning the tool for use on a machine as described in the above mentioned application. The adjustments of the tool form no part of the present invention and may be of any suitable character.

The tool head 16 is reciprocated in the guide 10 to move the tool across the face of the work to be operated upon, by means of a crank disc 25 which is secured to the spindle 26 which is journaled in the frame of the machine. The crank disc may be driven from any suitable source of power by any suitable means. The drive means shown include the shaft 27 (Fig. 1), the bevel gears 28, the shaft 29, the pinion 30 and the bevel gear 31 which is secured to the crank disc. The slide 11 is connected with the crank disc by the connecting rod 32 and the connecting pins 33 and 34. The pin 34, is adjustably mounted upon the crank disc to permit variation in the stroke of the tool. For this purpose the pin 34 is carried on a block 35 which is adjustable in a slot 36 formed in the face of the disc by means of a screw 37 which is carried by the disc and threads into the block 35. From the mechanism just described, it will be seen that as the crank disc 25 rotates, the tool will be reciprocated back and forth in the guide 11.

One of the principal features of this invention is the mechanism whereby the pivotal movement of the clapper block necessary to move the tool to and from cutting position is timed with the tool reciprocation. For the purpose of operating the clapper block, a cam 38 is preferably employed. This cam will be preferably in the form of a groove 38 in the periphery of the crank disc 25. Hence as the crank disc rotates the cam will rotate and the two cannot get out of their predetermined timed relationship.

The cam 38 serves to withdraw the tool from and to return it to cutting position at the desired points in the tool stroke through he mechanism now to be described. Slidably mounted in a sleeve 40 secured to the frame 12 is a rod 41 which carries at one end a roller 42 which engages in the cam slot 38. This rod 41 has a flexible connection as by means of springs 43 with a sleeve 44 to which are secured or with which are formed integral a pair of racks 45 which mesh with a pair of pinions 46 preferably formed integral with sleeve members 47 which are journaled in the sleeve 40.

Each sleeve member 47 is provided at one end with a socket 48 which is adapted to receive the stud portion 49 of one member 50 of a universal joint connection 51 between the sleeve member 47 and the telescoping shaft 52. The universal joint member 50 may be secured to either sleeve member 47 by the bolt 53, both sleeve members being suitably bored to receive this bolt.

The telescoping shaft 52 is connected by another universal joint 54 with a shaft 55 (Fig. 2) which is journaled in the clapper block support 15 and which drives through the bevel gearing 56 a shaft 57 also journaled in the clapper block support. This shaft 57 carries a pinion 58 which meshes with a movable rack 59 which slides in a groove 60 (Fig. 3) provided therefor in the clapper block support 15. The rack 59 meshes with a segmental spur gear 61 to which is secured the pin 62 which is fastened to a block 63 which is adapted to slide in a slot 64 formed in the clapper block 14.

The arrangement is such that the tool is swung to and from operative position by the reciprocating movement of the rod 41 under actuation of the cam 38, the reciprocating movement of this rod 41 being transmitted through one rack 45, one pinion 46, the telescoping shaft 52, the bevel gearing 56, the shaft 57, the pinion 58 and the rack 59 to the segmental gear 61 which oscillates the clapper block 14 about its pivot 65. The pivotal movement of the clapper block is maintained at all times in the desired timed relation with reference to the reciprocating movement of the tool so that when the tool has finished its cutting stroke the clapper block is swung about its pivot to move the tool from cutting position and when the tool has completed its return stroke the clapper block is again swung about its pivot to return the tool to cutting position.

The two racks 45 and the two pinions 46 are provided to permit of swinging the clapper block in either direction at either end of the tool slide stroke, as it may be desired to cut on a pull stroke of the tool or on a push stroke. By connecting the universal joint member 50 with either of the pinions 46, as desired, the clapping movement can be accomplished at the proper point in the cutting stroke, as will be readily understood.

One feature of this invention is the means for locking the tool in cutting position so as to prevent chatter during the cutting operation. To this end, a toggle member 66 is provided (Figs. 3 and 4) which is pivotally mounted on the rack 59. This toggle member is adapted to seat in a recess 67 formed in the clapper block 14 when the tool is in cutting position to clamp the clapper block securely in its forward position with the projection 68 formed on the clapper block firmly seated against the face of the lug 69 which is fastened to the clapper block support 15. The rack 59 will occupy the position shown in Fig. 3 when the tool is cutting, with the toggle member 66 engaging in the recess 67. As soon, however, as the rack 59 begins to move through rotation of the pinion 58 to withdraw the tool from cutting position, the spring pressed plunger 70 which is housed in the clapper block support 15 will force the toggle 66 out of locking position, and thus permit swinging of the clapper block about its pivot 65. The tool is shown completely withdrawn in Fig. 4.

A layout of the cam 38 is shown in Fig. 8.

While I have described my invention in connection with a specific structure, it is to be understood that the invention is capable of various further modifications without departing from its scope and that this application is intended to cover any adaptations or embodiments following, in general, the principles of the invention and including such departures from the present disclosure as come within known or customary practise in the gear art and may be applied to the successful features hereinbefore set forth and as fall within the scope of the invention or the limits of the appended claims.

Having thus described my invention, what I claim, is:

1. The combination with a tool slide, of a clapper block pivotally mounted on said slide, a tool secured to said clapper block, means for reciprocating said slide, an oscillatable member, means including a pin carried by said oscillatable member and a block movable in a slot in said clapper block for operatively connecting said oscillatable member with said clapper block, and means operatively connected with said tool slide reciprocating means for oscillating said member, at determinate points in the tool movement, to move the clapper block about its pivot.

2. The combination with a tool slide, of a clapper block pivotally mounted on said slide, a tool secured to said clapper block, a crank disc and connecting rod for reciprocating said slide, an oscillatable member, means including a pin carried by said oscillatable member and a block movable in a slot in said clapper block for operatively connecting said oscillatable member with said clapper block, and a cam, rotatable with said crank disc, controlling the oscillatable movement of said member.

3. The combination with a reciprocating tool slide, of a clapper block pivotally mounted on said slide, a tool secured to said clapper block, an oscillatable member, a pin secured to said member eccentrically of its axis, a block mounted on said pin for movement in a slot formed in said clapper block and means for oscillating said member to move the clapper block on its pivot.

4. The combination with a reciprocating tool slide, of a clapper block pivotally mounted on said slide, a tool secured to said clapper block a reciprocable member, an oscillatable member operatively connected with said reciprocable member and adapted on movement of said reciprocable member to move said clapper block about its pivot and means carried by said reciprocable member acting when the reciprocable member is at one limit of its movement to lock said clapper block and tool in cutting position.

5. The combination with a reciprocating tool slide, of a clapper block pivotally mounted on said slide, a tool secured to said clapper block, a reciprocatory rack, gearing connecting said rack and clapper block and controlling the pivotal movement of said clapper block and means carried by said rack adapted to engage said clapper block at one limit of the rack movement to lock said clapper block and tool in cutting position.

6. The combination with a reciprocating tool slide and means for operating the same, of a clapper block pivotally mounted on said slide, a tool secured to said clapper block, a reciprocatory rack, gearing connecting said rack and clapper block for moving said clapper block on its pivot on movement of said rack, means carried by said rack adapted to engage said clapper block at one limit of the rack movement to lock said clapper block and tool in cutting position and means for periodically reciprocating said rack, said means being operatively connected with said tool slide reciprocating means.

7. The combination with a reciprocating tool slide and means for operating the same, of a clapper block pivotally mounted on said slide, a tool secured to said clapper block, a reciprocatory rack, gearing connecting said rack and clapper block for moving said clapper block on its pivot on movement of said rack, means carried by said rack adapted to engage said clapper block at one limit of the rack movement to lock said clapper block and tool in cutting position and a cam operatively connected with said tool slide reciprocating means for controlling the movement of said rack.

8. The combination with a reciprocating tool slide, a crank disc and connecting rod for operating the same, of a clapper block pivotally mounted on said slide, a tool secured to said clapper block, a reciprocatory rack, gearing connecting said rack and clapper block for moving said clapper block on its pivot on movement of said rack, means carried by said rack adapted to engage said clapper block at one limit of the rack movement to lock said clapper block and tool in cutting position and a cam secured to said crank disc for controlling the movement of said rack.

9. The combination with a reciprocating tool slide, of a clapper block pivotally mounted on said slide, a tool secured to said clapper block, a reciprocatory member, means connecting said reciprocatory member with said clapper block for moving said clapper block on its pivot, and a toggle secured to said reciprocatory member adapted to be engaged in a recess in said clapper block when said reciprocatory member reaches one limit of its movement to lock the clapper block in cutting position.

10. The combination with a reciprocatory tool slide, of a clapper block pivotally mounted on said slide, a tool secured to said clapper block, a reciprocatory member, means connecting said reciprocatory member with said clapper block for moving the clapper block on its pivot, a toggle secured to said reciprocatory member adapted to be engaged in a recess in said clapper block when said reciprocatory member reaches one limit of its movement to lock the clapper block in cutting position and means adapted to force the toggle member from locking position when the reciprocatory member starts to move in the opposite direction.

11. The combination with a reciprocating tool slide and means for operating the same, of a clapper block pivotally mounted on said slide, a tool secured to said clapper block, two gears rotatable in opposite directions, means adapted to be connected with either of said gears for moving said clapper block on its pivot and means operatively connected with said tool slide reciprocating means for periodically rotating said gears.

12. The combination with a reciprocatory tool slide, means for operating the same, a clapper block pivotally mounted on said slide, and a tool secured to said clapper block, of a reciprocable rod, a pair of racks carried by said rod, two gears meshing with said racks and adapted to be driven in opposite directions on reciprocation of said rod, a lug connected with said rod, a rotary cam member having an operative connection with said lug, and means adapted to be connected with either of said gears for moving the clapper block on its pivot.

13. The combination with a reciprocating tool slide, means for operating the same, a clapper block pivotally mounted on said slide, and a tool secured to said clapper block, of means for moving the clapper block about its pivot comprising a reciprocable rod, a pair of racks carried by said rod, two gears meshing with said racks and adapted to be driven in opposite directions on reciprocation of said rod, a lug connected with said rod, a rotary cam member having an operative connection with said lug, an oscillatory member, means connecting said oscillatory member with said clapper block, a telescoping shaft capable of being secured to either of said gears and gearing connecting said telescoping shaft with said oscillatory member.

14. The combination with a reciprocatory tool slide, means for operating the same, a clapper block pivotally mounted on said slide, and a tool secured to said clapper block, of a reciprocable rod, a pair of racks carried by said rod, two gears meshing with said racks and adapted to be driven in opposite directions on reciprocation of said rod, means adapted to be connected with either of said gears adapted on actuation of the same to move the clapper block on its pivot, a lug connected with said rod, and a rotary cam member having an operative connection with said lug and operatively connected with said tool slide reciprocating means.

15. The combination with a reciprocating tool slide, of a clapper block pivotally mounted on said slide, a tool secured to said clapper block, a reciprocable member, and an oscillatable member operatively engaged therewith, said members being so connected that movement of one causes movement of the other, means for periodically moving one of said members, means on the oscillatable member adapted on movement thereof to rock said clapper block about its pivot, and means on said reciprocable member acting, when the reciprocable member is at one limit of its movement, to lock said clapper block and tool in cutting position.

16. The combination with a reciprocating tool slide, of a clapper block pivotally mounted on said slide, a tool secured to said clapper block, a reciprocable member, and an oscillatable member operatively engaged therewith, said members being so connected that movement of one causes movement of the other, means for periodically moving one of said members, means on the oscillatory member adapted on movement thereof to rock said clapper block about its pivot, and a toggle secured to said reciprocable member adapted to be engaged in a recess in said clapper block when said reciprocable member reaches one limit of its movement to lock the clapper block in cutting position.

17. The combination with a reciprocating tool slide, and a crank disc and connecting rod for reciprocating the same, of a clapper block pivotally mounted on said slide, a tool secured thereto, means for moving said clapper block periodically about its pivot including a cam member secured to said crank disc, a rod operatively connected with said cam member and reciprocable on rotation thereof, a telescoping shaft, gearing operatively connecting said shaft to said rod adapted to oscillate said shaft on reciprocation of said rod and gearing operatively connecting said shaft with said clapper block adapted to oscillate said clapper block about its pivot on oscillation of said shaft.

18. The combination with a reciprocating tool slide, and a crank disc and connecting rod for reciprocating the same, of a clapper block pivotally mounted on said tool slide, a tool secured thereto, means for moving said clapper block periodically about its pivot including a cam member secured to said crank, a rod operatively connected with said cam member and reciprocable on rotation thereof, a telescoping shaft, gearing operatively connecting said shaft to said rod adapted to oscillate said shaft on reciprocation of said rod, an oscillatable member, a reciprocable member, gearing connecting these two members adapted to move one on movement of the other, means operatively connecting said telescoping shaft with one of said members adapted to move one of said members on oscillation of said shaft, a pin and block connection between said oscillatory member and clapper block adapted on oscillation of said member to move the clapper block on its pivot and means carried by said reciprocable member acting when the reciprocable member is at one limit of its movement to lock said clapper block and tool in cutting position.

MAGNUS H. JOHANSON.